United States Patent [19]

Early, Jr.

[11] Patent Number: 5,253,700

[45] Date of Patent: Oct. 19, 1993

[54] CLIMATE CONTROL SYSTEM FOR REFRIGERATED TRACTOR-TRAILERS

[76] Inventor: George M. Early, Jr., 108 Laurie Dr., Ormond Beach, Fla. 32176

[21] Appl. No.: 20,351

[22] Filed: Feb. 22, 1993

[51] Int. Cl.$^5$ ............................................. B60H 3/00
[52] U.S. Cl. ...................................... 165/42; 62/239; 62/455; 454/91
[58] Field of Search .................. 62/299, 239, 244, 455; 454/91; 165/42

[56] References Cited

U.S. PATENT DOCUMENTS

| | | | |
|---|---|---|---|
| 227,874 | 5/1880 | Babbott et al. | 62/244 |
| 2,115,344 | 4/1938 | Stacey, Jr. | 62/24 |
| 2,892,324 | 6/1959 | Quick | 62/455 |
| 3,211,076 | 10/1965 | Chancellor et al. | 98/2 |
| 3,855,814 | 12/1974 | Eubank | 62/244 |
| 4,172,494 | 10/1979 | Saulters | 62/244 X |

Primary Examiner—William E. Wayner
Attorney, Agent, or Firm—Kennedy & Kennedy

[57] ABSTRACT

A climate control system (25) for the cabin (13) of a tractor (11) coupled to a trailer (12) that has a refrigeration unit (17). The refrigeration unit supplies cooled air to the trailer through an outlet duct (21) and expels warmed air used to ventilate the refrigeration system, to ambience through a ventilation exhaust duct (19). The climate control system has a duct (48) for receiving and conducting warmed ventilation air from the refrigeration system exhaust duct to the cabin. The system also has a duct (51) for receiving and conducting cooled air from the refrigeration system outlet duct to the cabin. The ducts are coupled to an air flow control unit (26) which controls the flow of air through the ducts and into the cabin.

12 Claims, 2 Drawing Sheets

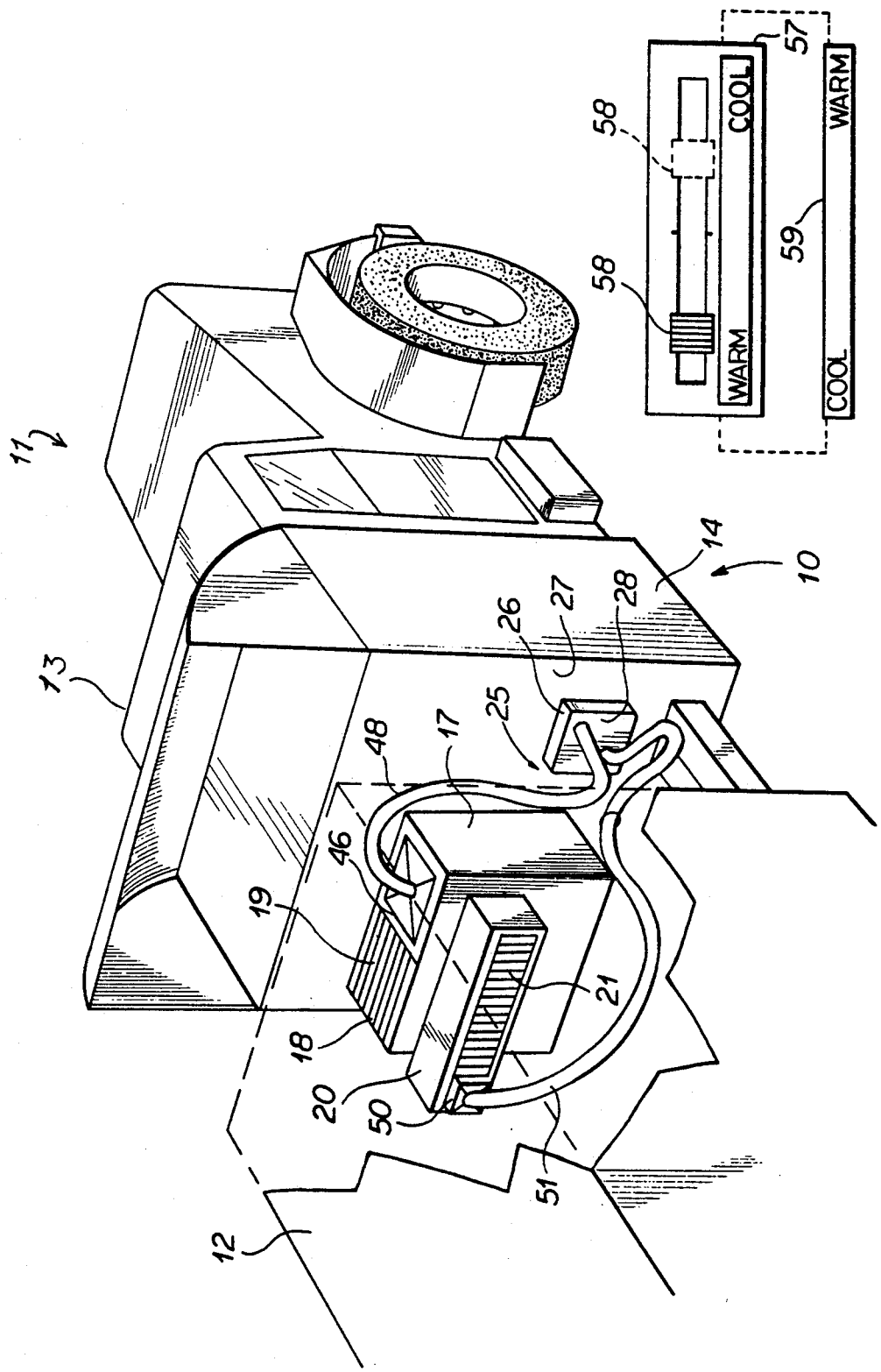

CLIMATE CONTROL SYSTEM FOR REFRIGERATED TRACTOR-TRAILERS

TECHNICAL FIELD

This invention relates to climate control systems for the cabins of tractors-trailer trucks that drive refrigerated trailers.

BACKGROUND OF THE INVENTION

Today there exists a vast number of tractor-trailers which are used to transport freight in the trucking industry. Many of these trailers are refrigerated in order to be used to transport perishable goods. Refrigerated trailers typically have a refrigeration unit mounted to the front of the trailer. The refrigeration unit houses a refrigeration system that typically includes a small diesel engine which continuously or cyclically powers a heat exchanger in the refrigeration system.

In cold weather the freight contained within a trailer may be required to be kept warmer than the ambient temperature. For this reason, the heat exchanger, typically in the form of a heat pump, can be operated in a reverse thermodynamic cycle so as to supply warmed air to the interior of the trailer upon demand. The heat pump is also used in reverse cycle to melt ice which accumulates on the evaporator coils during a refrigeration cycle. The heat pump thereby defrosts the refrigeration system. During the defrost operations a damper prevents the warm air from entering the trailer.

The tractor also usually has a climate control system itself for controlling the temperature of the air within the cabin for the benefit of the driver. The climate control system of the tractor is comprised of both a refrigeration system and a heating system. Each system is driven by the tractor engine. The incremental energy to operate these systems is low while the engine is used to drive the tractor-trailer. However, oftentimes drivers rest or sleep in the cabin with the tractor-trailer parked. Should a driver wish to operate either one of the tractor's climate control systems during this rest period, the tractor engine must be operated merely to drive the climate control system. This results is an increase in fuel consumption which is wasteful, because even at idle the tractor engine produces far more power than is necessary to drive the cabin climate control systems.

An effort has heretofore been made to solve this problem by tapping into the refrigeration system of the trailer as shown in U.S. Pat. No. 3,211,076. However, as this system does not provide warm air to the cabin, the engine of the tractor must still be operated in order to warm the cabin in cold weather. This system also cannot cool the cabin when the heat exchanger is operated in a reverse thermodynamic cycle.

Accordingly, it is seen that a need remains for a climate control system which selectively provides cooled or warmed air to the cabin of a tractor-trailer having a trailer refrigeration system. Accordingly, it is to the provision of such that the present invention is primarily directed.

SUMMARY OF THE INVENTION

In a preferred form of the invention, a climate control system for the cabin of a tractor coupled to a trailer that has a refrigeration system which may supply cooled air to the trailer through an outlet duct in fluid communication with the interior of the trailer and which may expel air used to ventilate the refrigeration system, being thereby warmed, to ambience through a ventilation exhaust duct comprises first conduit means for conducting warmed ventilation air from the trailer refrigeration system ventilation duct to the cabin and second conduit means for conducting cooled air from the trailer refrigeration system outlet duct to the cabin. The climate control system also has control means for selectively controlling the flow of air through the first and second conduit means. With this construction the air temperature within the cabin may be controlled through the selective conveyance of either cooled air or warmed air from the refrigeration system of the trailer to the cabin.

BRIEF DESCRIPTION OF THE DRAWING

FIG. 1 is a perspective view of a refrigerated tractor-trailer having a climate control system that embodies principles of the invention in a preferred form, shown with a portion of the trailer removed for clarity.

FIG. 4 is a front view of a climate control regulator or thermostat of the climate control system of FIG. 1.

DETAILED DESCRIPTION

Figure 3:
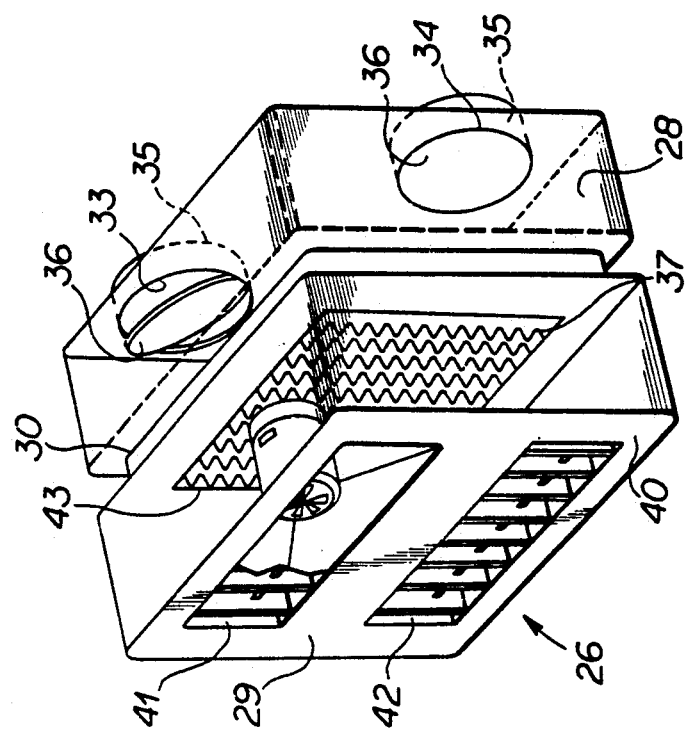
FIG. 3 is a perspective view of a portion of an air flow control unit of the climate control system of FIG. 1, shown with portions removed for clarity.

With reference next to the drawings, there is shown in FIG. 1 a tractor-trailer 10 comprising a tractor 11 articulatorily coupled to a refrigerated trailer 12. The tractor 11 has a cabin 13 which includes a sleeper 14. The trailer 12 has a refrigeration unit 17 mounted to a front wall of the trailer 12 behind the tractor 11. The refrigeration unit 17 has an exterior portion 18, mounted to the outside of the trailer, that contains an unshown heat pump which is driven by a unshown, small diesel engine. The exterior portion 18 also has a ventilation exhaust duct 19 terminating at the top thereof. Air used to vent the heat produced by the heat exchanger is expelled to ambience through the exhaust duct 19. The refrigeration unit 17 also has an interior portion 20, mounted to the inside of the trailer, having an outlet duct 21 in fluid communication with the interior of the trailer through which air cooled by the heat pump is supplied.

Figure 2:
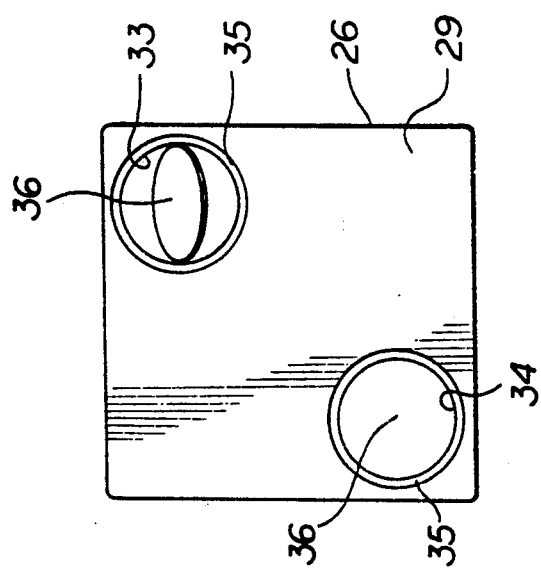
FIG. 2 is a rear view of an air flow control unit of the climate control system of FIG. 1.

As generally shown in FIG. 1, a climate control system 25 is mounted to the tractor-trailer 10. The climate control system 25 has an air flow control unit 26 mounted to the rear wall 27 of the tractor 11. As best shown in FIGS. 2 and 3, the control unit 26 has an exterior housing 28 and an interior housing 29. Fluid communication between each housing is provided by an air duct 30 that passes through the rear wall 27 of the tractor 11 and the front wall of the trailer 12. The exterior housing 28 has an upper inlet port 33 and a lower inlet port 34. Each of the inlet ports 33 and 34 is bordered by an annular mounting flange 35 extending outwardly therefrom. A rotatable butterfly-type control valve 36 is mounted in each inlet port 33 and 34. The interior housing 29 has an array of electric heating elements 37 positioned adjacent the air duct 30. An upper, louvered opening 41 and a lower louvered opening 42 extend into a front face plate 40 of the interior housing 29. The upper opening 41 has an electric fan 43 coupled thereto.

With reference again to FIG. 1, a cover plate 46 is mounted to the ventilation exhaust duct 19 of the refrigeration unit 17. The cover plate 46 has a central hole therein bordered by an unshown outwardly extending annular flange. A flexible air duct 48 is mounted to the annular flange of the cover plate 46 so as to be in fluid communication with the exhaust duct 19. The opposite end of air duct 48 is releasibly coupled to the flange 35 of the upper inlet port 33 of the air flow control unit 26. A cover plate 50 is mounted to the outlet duct 21 of the refrigeration unit 17. The cover plate 50 has a central hole therein bordered by an unshown outwardly extending annular flange. A second flexible air duct 51 is mounted to the annular flange of the cover plate 50 so as to be in fluid communication with the outlet duct 21. The opposite end of air duct 51 is releasibly coupled to the lower inlet port 34 of the air flow control unit 26.

The climate control system 25 may be controlled by conventional mechanical or electrical regulators. For example, the climate control system may be mechanically controlled by a mechanical regulator 57 of the type having a slide lever 58, as pictorially shown in FIG. 4. The slide lever 58 is coupled to the control valves 36 through movable cables which progressively open and close the control valves 36. Alternatively, the control valves 36 may be coupled to solenoids which are controlled electrically.

With the refrigeration unit 17 operating in a cool mode to cool the interior of the trailer, cooled air is supplied to the trailer through outlet duct 21 and the warmed, venting air is expelled to ambience through the ventilation exhaust duct 19, as previously discussed. To cool the cabin of the tractor 11, the slide lever 58 of the regulator 57 is moved to a cool position, as illustrated by phantom lines in FIG. 4. With the slide lever 58 in its coolest position the control valve 36 of the lower inlet port 34 is positioned fully opened to allow maximum air flow therethrough, and the control valve 36 of the upper inlet port 33 is positioned fully closed. Cooled air supplied to the trailer through outlet duct 21 is received and directed by the cover plate 50 into air duct 51. The cooled air is conveyed through the air duct 51 and into the air flow control unit 25. The cooled air then passes through the air duct 30, heating elements 37, and openings 41 and 42, and into the cabin. The electric fan 43 may be energized selectively to increase the air flow of the cooled air into the cabin.

The slide lever 58 is selectively positionable at warmer positions within the cool range of the regulator 57. The control valve 36 of the lower inlet port 34 is then somewhat closed so as to restrict the air flow of the cooled air therethrough. The control valve 36 of the upper inlet port 33, however, remains fully closed.

With the slide lever 58 positioned at a midpoint between the coolest and warmest positions of the regulator, both control valves are fully closed. However, air may still by circulated through the cabin by energizing the fan 43 which draws air in through the lower opening 42 and exhausts it through the upper opening 41 back into the cabin. Should the slide lever 58 be positioned within the warm range of the regulator 57, i.e. between the midpoint position and the warmest position of the regulator, the control valve 36 of the upper inlet port 33 is opened to allow a corresponding flow of warm air therethrough, as shown in FIGS. 2 and 3. The control valve of the lower inlet port 34, however, remains fully closed. The warmed air flows through the control unit 26 in the same manner as previously described with reference to the cooled air. With the slide lever 58 in its warmest position, the control valve 36 of the upper inlet port 33 is fully opened to allow the maximum air flow therethrough. The warmed air may be supplemented with additional heat by energizing heating elements 37. The energizing of the heating elements may be controlled manually or automatically as with a conventional thermostat.

With the heat pump operating in reverse, i.e. in a warm mode, warmed air is supplied to the interior of the trailer through outlet duct 21 while cooled air is expelled to ambience through ventilation exhaust duct 19. Because the system may produce both warmed and cooled air, the term "conditioned air" may be used to describe air supplied by the heat pump. The climate control system 25 works in substantially the same manner in this mode, as previously discussed, with the exceptions that the cooled air flow and warmed air flow are switched and the warm and cool positions of the slide lever 58 of the regulator must be accordingly reversed. The reversal of the positions of the slide lever may be accomplished by simply placing a removable plate 59 having temperature insignias displayed in opposite fashion than the initial insignias.

As an alternative to at least one control valve 36 being fully closed, the air flow control system may open each control valve a varying degrees to achieve a selected temperature from the combination of warmed and cooled air.

It should be understood that the just described climate control system may be operated with the tractor-trailer underway or stationary. Also, at times the cooled air supplied by the heat pump may be so cold as to require it to be warmed by the heating elements 37 prior to entering the cabin, as these heat pumps often supply air at $-20°$ F.

Additionally, should the trailer 12 be disconnected from the tractor 11, unshown removable caps may be mounted to the flanges 35 of the inlet ports 33 and 34 to prevent air or foreign matter from entering the control unit. Also, it is preferred that the electric fan 43 and heating elements 37 be energized by the refrigeration unit to prevent the electrical drainage of the tractor's batteries while the tractor engine is not operating. An unshown electrical conductor connects the electric fan 43 to the electrical power source of the heat pump. A switch coupled to the conductor selectively activates the fan.

From the foregoing it is seen that a climate control system for refrigerated tractor-trailers is now provided which overcomes inefficiencies and energy waste problems long associated with those of the prior art. It should be understood however that the just described embodiment merely illustrates principles of the invention in its preferred form. Many modifications, additions and deletions may, of course, be made thereto without departure from the spirit and scope of the invention as set forth in the following claims.

I claim:

1. A climate control system for the cabin of a tractor coupled to a trailer that has a refrigeration system which may supply cooled air to the trailer through an outlet duct in fluid communication with the interior of the trailer and which may expel air used to ventilate the refrigeration system, being thereby warmed, to ambience through a ventilation exhaust duct, and with the climate control system comprising first conduit means for conducting warmed ventilation air from the trailer refrigeration system ventilation duct to the cabin; second conduit means for conducting cooled air from the trailer refrigeration system outlet duct to the cabin; and control means for selectively controlling the flow of air through said first and second conduit means, whereby the climate within the cabin may be controlled through the selective conveyance of either cooled air or warmed air from the refrigeration system of the trailer to the cabin.

2. The climate control system of claim 1 wherein said control means includes a first valve which controls the flow rate of the warmed air through said first conduit means and a second valve which controls the flow rate of the cooled air through said second conduit means.

3. The climate control system of claim 1 further comprising an electrical heating element for heating air conveyed into the cabin through said first and second conduit means.

4. The climate control system of claim 1 further comprising an electric fan for drawing air through said first and second conduit means.

5. A climate control system for the cabin of a tractor coupled to a trailer having a heat pump which may supply conditioned air to the trailer through an outlet duct in fluid communication with the interior of the trailer and which may expel air used to ventilate the heat pump to ambience through a ventilation exhaust duct, the climate control system comprising a duct having one end mounted to receive a portion of ventilation air expelled from the heat pump ventilation duct and an opposite end mounted in fluid communication with the cabin; and control means for controlling the flow of air through said duct whereby the climate within the cabin may be controlled through the conveyance of the ventilation air from the heat pump of the trailer to the cabin.

6. The climate control system of claim 5 wherein said control means includes a first valve which controls the flow rate of ventilation air through said duct.

7. The climate control system of claim 5 further comprising an electrical heating element for heating air conveyed into the cabin through said duct.

8. The climate control system of claim 5 further comprising an electric fan for drawing air through said duct.

9. The climate control system of claim 5 further comprising another second duct having one end mounted to receive a portion of the conditioned air expelled from the heat pump outlet duct and an opposite end mounted in fluid communication with the cabin; and wherein said control means also controls the flow of air through said other duct.

10. The climate control system of claim 9 wherein said control means includes a first valve which controls the flow rate of the ventilation air through said duct and a second valve which controls the flow rate of the conditioned air through said other duct.

11. The climate control system of claim 9 further comprising an electrical heating element for heating air conveyed into the cabin through said duct and said other duct.

12. The climate control system of claim 9 further comprising an electric fan for drawing air through said duct and said other duct.

* * * * *